United States Patent

Reslein

[11] Patent Number: 5,727,495
[45] Date of Patent: Mar. 17, 1998

[54] SURFACE EFFECT VEHICLE

[76] Inventor: James Patrick Reslein, 4919 Cordova Bay Rd., Victoria, British Columbia, Canada, V8Y 2KI

[21] Appl. No.: 643,346

[22] Filed: May 6, 1996

[51] Int. Cl.$^6$ ........................................ B63B 1/16
[52] U.S. Cl. ........................... 114/272; 114/273; 440/37; 180/126; 180/127
[58] Field of Search ................... 184/116, 126, 184/127; 114/261, 262, 272, 292, 288, 289, 273; 440/37

[56] References Cited

U.S. PATENT DOCUMENTS

| | | | |
|---|---|---|---|
| 1,875,190 | 8/1932 | Collins | 114/272 |
| 3,390,655 | 7/1968 | Quady et al. | 114/1 |
| 3,830,179 | 8/1974 | Lippisch | 114/67 |
| 3,903,832 | 9/1975 | Ishida | 440/37 |
| 3,908,783 | 9/1975 | Joerg et al. | 180/116 |
| 4,442,986 | 4/1984 | Rousseau | 244/12.1 |
| 5,105,898 | 4/1992 | Bixel, Jr. | 180/126 |
| 5,267,626 | 12/1993 | Tanfield, Jr. | 180/126 |
| 5,273,238 | 12/1993 | Sato | 114/272 |
| 5,357,894 | 10/1994 | Jacobson | 114/272 |
| 5,415,365 | 5/1995 | Ratiff | 114/272 |
| 5,464,069 | 11/1995 | Gifford | 180/116 |

FOREIGN PATENT DOCUMENTS 2120990  12/1983  United Kingdom ............ 180/116

OTHER PUBLICATIONS

"Ram-wing X-114", Popular Science, Dec. 1977, pp. 71–73.
"License To Fly", Popular Mechanics, Jul. 1989, pp. 57–59, 124.
"The Boat That Flies", Popular Science, Apr. 1992, pp. 56–60, 111.
"Wingships", Popular Mechanics, may 1992, pp. 35–38, 123.
"His and Hers", Nieman Marcus literature, re Model L-324 ground-effect vehicle of Flarecraft Corporation, 1993.
"Neither Fish Nor Fowl", Flying, Jul. 1994, pp. 71–76.
"U.S. Wingship Pursuit Keyed to ARPA Study", Aviation Week, Aug. 1994, pp. 55–56.
"Wing-In-Ground-Effect Craft", Jane's Surface Skimmers, 1994–95, pp. 336–346.

Primary Examiner—Scott Cummings
Attorney, Agent, or Firm—Shlesinger Arkwright & Garvey LLP

[57] ABSTRACT

A surface effect vehicle includes a vehicle body having opposed longitudinally extending sides and a longitudinally extending deck having an upper and lower surfaces extending widthwise between the sides. The lower surface together with opposed inner surfaces of the sides form a downwardly depending air entrapment chamber extending longitudinally beneath the lower surface. The chamber is reactive to provide substantial surface effect ram air lifting force on the vehicle in response to forward motion of the vehicle. In addition, the vehicle includes an airfoil spaced above and interconnected with the vehicle body to provide substantial out of surface effect lifting force on the vehicle in response to such forward motion. Further the vehicle vertical stabilizers serving not only to provide vertical stabilization but also to interconnect the airfoil with the vehicle body. Additional stabilization may be achieved by the provision of opposed stabilizing sides each extending longitudinally forward from a corresponding one of the vertical stabilizers and downwardly from a corresponding end of the airfoil. Such stabilizing sides together with a lower surface of the airfoil form a longitudinally extending, downwardly depending, air channel above the upper surface of the deck. In a preferred embodiment, the vehicle body includes a pair of pontoons to provide flotation in water. Each pontoon may include an intermediate bottom portion which sits lowermost when the vehicle is idly afloat, a forward bottom portion which extends upwardly and forwardly from the intermediate portion, and an elongated rearward bottom portion which extends upwardly and rearwardly from the intermediate portion.

4 Claims, 2 Drawing Sheets

SURFACE EFFECT VEHICLE

FIELD OF THE INVENTION

This invention relates to vehicles of the type wherein forward motion of the vehicle results in the development of a dynamic air pressure or ram air lifting force between the vehicle and ground sufficient to maintain sustained flight near the ground. Such vehicles are commonly referred to as surface effect or as ground effect vehicles.

BACKGROUND TO THE INVENTION

Herein, it is to be understood that the words "surface effect" or "ground effect" are essentially a reference to the earth's surface and includes reference to surface expanses such as dry land, water and ice. Usage of the words "surface effect" is preferred because the words "ground effect" may be implied to exclude water.

The concept of surface effect flight has been known and reduced to practice for many years. According to one published article, theoretical studies were conducted as early as 1921 (see "Ram-wing X-114 *floats, skims, and flies*", Popular Science, Dec. 1977, p. 70). Today, one may see surface effect vehicles which range in size from the small or recreational variety designed to carry relatively light loads (e.g. the Flarecraft® vehicle of Flarecraft Corporation/ Ground Effect Craft Corp., Westport, Conn.) to massive structures capable of handling take-off weights well in excess of 100 metric tons, with substantially higher capacities proposed (see e.g. "*U.S. Wingship Pursuit Keyed to ARPA Study*", Aviation Week & Space Technology, 22 Aug. 1994, p. 55).

Although there are some exceptions, most surface effect vehicles which rely upon forward motion to develop lifting force have the appearance of a winged aircraft. This includes a central hull or fuselage with wings extending outwardly on either side, flaps, a tail assembly with horizontal and vertical stabilizers, elevators and rudders. The X-114 and Flarecraft vehicles noted above are examples of this type of craft. Other examples include the Russian "Orlyornok" wingship shown in the Aviation Week article noted above; the Russian "Sukhoi-Nizhny-Novogorod Ekranoplan" wingship shown at page 59 of the Apr. 1992 issue of Popular Science in an article about the Flarecraft vehicle ("*The Boat That Flies*", ibid at p. 56; see also "*Wingships*", Popular Mechanics, May 1992, p. 35); the "Power-Augmented Ram Wing-In-Ground Effect Vehicles" illustrated in U.S. Pat. No. 4,442,986 (Rousseau) granted on Apr. 17, 1984; and the "Strizh" wingship trainer and other surface effect vehicles shown in the Jul. 1994 issue of Flying at p. 71 et seq.

All of the foregoing winged surface effect vehicles are designed for water-based operations. They float in water, take off from water, and land in water. Typically, although they are capable of flying over dry land, most if not all of their flying time is restricted to flights over water. This is true of surface effect vehicles generally because in most situations water provides the only practical working environment for extended low level flying.

However, there are problems with such winged vehicles. Firstly, wings and water do not mix. If the tip of a wing catches the water, the results can be disastrous—and the problem is exacerbated because there is a relatively long moment arm represented by the length of the wing between the center of gravity of the vehicle and the point where the wing tip engages the water. Further, wings do not facilitate docking, loading and unloading of the vehicle. In addition, wings are not "road friendly". Especially in the case of a small or recreational vehicle, the owner may prefer to store the vehicle at home when it is not in use, and tow it by trailer to differing launch sites. However, this cannot be done or cannot be done easily if the width of the vehicle (wing tip to wing tip) exceeds that which is normally permitted under road and highway traffic regulations.

As indicated above, there are some surface effect vehicles which do not have the appearance of a conventional winged aircraft. One example is the delta wing vehicle disclosed in U.S. Pat. No. 5,464,069 (Gifford) granted on Nov. 7, 1995. This vehicle is a form of hybrid between those surface effect vehicles which rely upon ram air or forward motion to develop lifting force and those of the hovercraft class (also sometimes referred to as surface effect vehicles) which rely upon powerful fans or other means to produce an air cushion beneath the vehicle without the necessity of forward motion. However, the delta wing vehicle retains the disadvantage of extended wings. Moreover, the requirement for a hovering capability is achieved at the sacrifice of load carrying capacity.

Other examples of surface effect vehicles which do not have the appearance of conventional winged aircraft include catamaran type vehicles as disclosed in U.S. Pat. No. 3,390,655 (Quady et al.) granted on Jul. 2, 1968, and in U.S. Pat. No. 3,830,179 (Lippisch) granted on Aug. 20, 1974.

The vehicle proposed by Quady et al is again a form of hybrid—relying upon powerful fan jet engines to produce thrust for forward motion and, in hovercraft mode, relying upon the exhaust from those engines to produce an effective air cushion beneath the vehicle. The vehicle includes a tail assembly essentially like that of a conventional aircraft. It appears that lift capacity is substantial; however, them is likely a significant sacrifice in light of the requirement for hovering capability. For surface effect flight, load carrying capacity is essentially determined by the power of the jet exhaust and/or the lift characteristics of a wing shaped bridge structure which extends between (not outwardly from) the catamaran sides or hulls of the vehicle The catamaran type vehicle proposed by Lippisch has no hovering capability and is purely dependent upon ram air or forward motion to develop lifting force. The tail includes a rudder assembly as may be found on a conventional aircraft, but no horizontal stabilizer as may be found at the tail of a conventional aircraft. The load carrying capacity of the vehicle is essentially determined by the lift characteristics of an aerodynamic flat plate between the catamaran sides or hulls.

Catamaran type vehicles such as those proposed by Quady et al and Lippisch do not suffer from the disadvantages associated with wings which extend outwardly from the vehicle. However, in relation to their overall size from side to side and from fore to aft, the load carrying capacity which they provide is essentially limited to the characteristic lift, in surface effect, of the wing or plate which extends between the sides of the vehicle.

A primary object of the present invention is to provide a new and improved surface effect vehicle the load carrying capacity of which is not augmented by hovercraft type operation yet is not limited to the lift characteristics of an airfoil operating in surface effect.

A further object of the present invention is to provide such a vehicle which avoids the need for outwardly extending wings.

Yet another object of the present invention is to provide such a vehicle the overall size of which may be made relatively small thereby facilitating transport over public roads and highways without offending vehicle size restrictions.

SUMMARY OF THE INVENTION

In accordance with a broad aspect of the present invention, there is provided a surface effect vehicle comprising a vehicle body, an airfoil spaced above and interconnected with the body, and a propulsion means for providing forward motion to the vehicle. The body includes opposed longitudinally extending sides, and a longitudinally extending deck having an upper surface and a lower surfaces extending widthwise between the sides. Each side preferably comprises a pontoon to provide vehicle flotation for water-based operations.

The lower surface of the deck together with opposed inner surfaces of the sides form a downwardly depending air entrapment chamber which extends longitudinally beneath the lower surface. The air entrapment chamber is reactive to provide substantial surface effect ram air lifting force on the vehicle in response to forward motion of the vehicle.

The airfoil is positioned to provide a center of lift substantially forward of a trailing end of the air entrapment chamber and is reactive to provide substantial out of surface effect lifting force on the vehicle in response to the same forward motion as the result of which the air entrapment chamber provides substantial surface effect ram air lifting force.

The vehicle further includes vertical stabilizing means for providing aerodynamic vertical stabilization for the vehicle. Such stabilizing means comprises vertical stabilizers which serve not only to provide stabilization but also to interconnect the airfoil with the vehicle body. Additional stabilization may be achieved by the provision of opposed stabilizing sides each extending longitudinally forward from a corresponding one of the vertical stabilizers and downwardly from a corresponding end of the airfoil. Together with a lower surface of the airfoil, the stabilizing sides form a longitudinally extending, downwardly depending, air channel above said upper surface of said deck.

In a preferred embodiment, the sides of the vehicle body comprise a pair of pontoons to provide water flotation for the vehicle. Preferably, each pontoon includes an intermediate bottom portion which sits lowermost when the vehicle is idly afloat in water, a forward bottom portion which extends upwardly and forwardly from the intermediate bottom portion, and an elongated rearward bottom portion which extends upwardly and rearwardly from the intermediate bottom portion.

The foregoing and other features and advantages of the invention will now be described with reference to the drawings.

DETAILED DESCRIPTION

Figure 1:
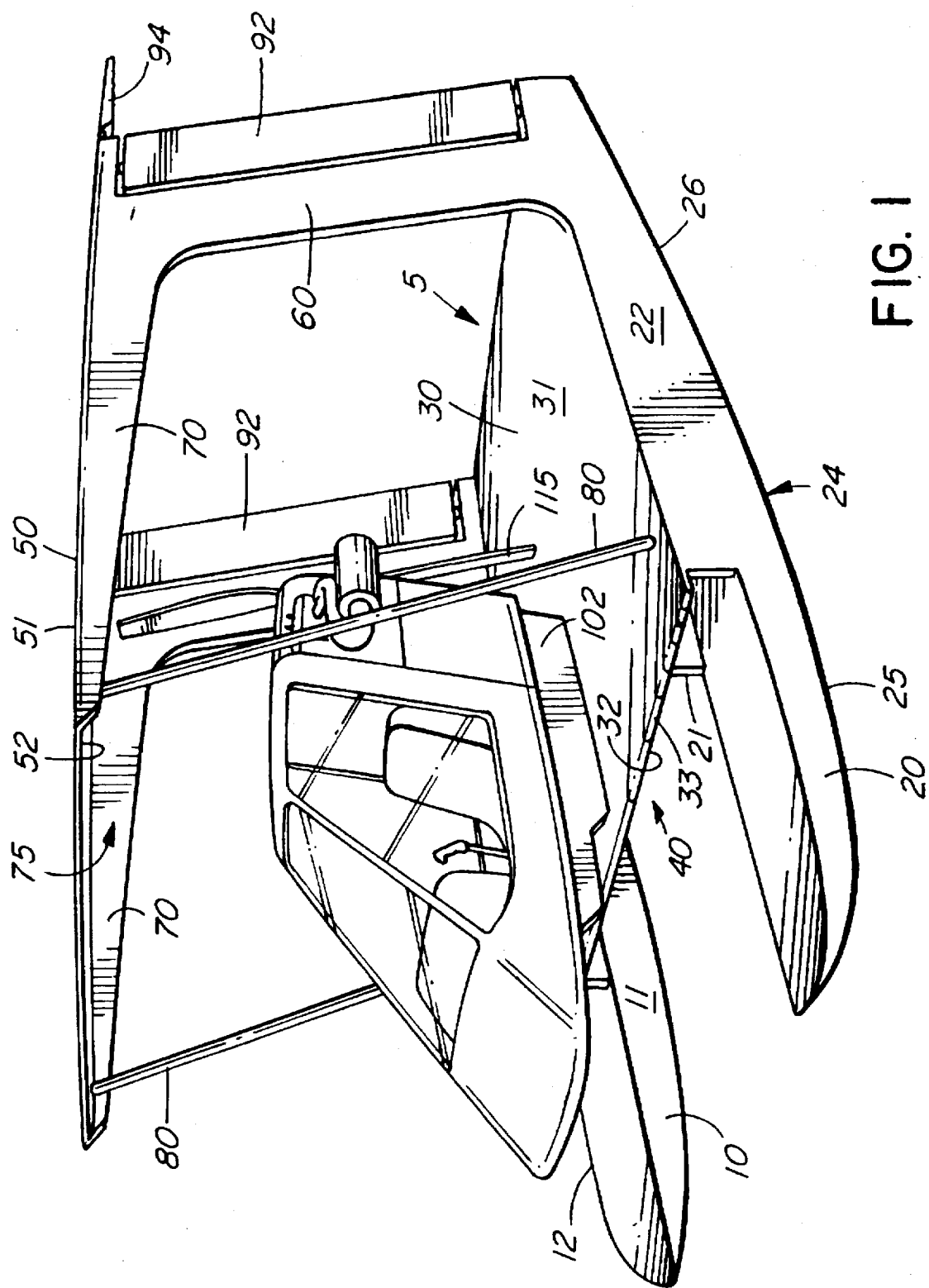
FIG. 1 is a perspective view of a surface effect vehicle in accordance with the present invention.

The surface effect vehicle shown in the Figures includes a vehicle body generally designated 5 having opposed longitudinally extending sides 10, 20 formed by a pair of pontoons, and a deck 30 with upper and lower surfaces 31, 32 extending widthwise between the sides. A water rudder 90 for turning control in water extends downwardly from deck 30. The pontoon sides 10, 20 provide vehicle flotation for water-based operations and are characterized by opposed inner surfaces 11, 21 and outward surfaces 12, 22. Lower surface 32 of deck 30 together with those portions of opposed inner surfaces 11, 21 which extend below deck 30 form a downwardly depending air entrapment chamber 40 beneath the vehicle.

Lengthwise, chamber 40 extends from a leading end approximately coincident with leading edge 33 of deck 30 to a trailing end which is approximately coincident with trailing edge 34 of deck 30. Lower surface 32 is sloped fore to aft thus presenting a forward angle of attack which enhances the responsiveness of chamber 40 to develop positive pressure lifting force on the vehicle in response to forward motion of the vehicle.

Figure 2:
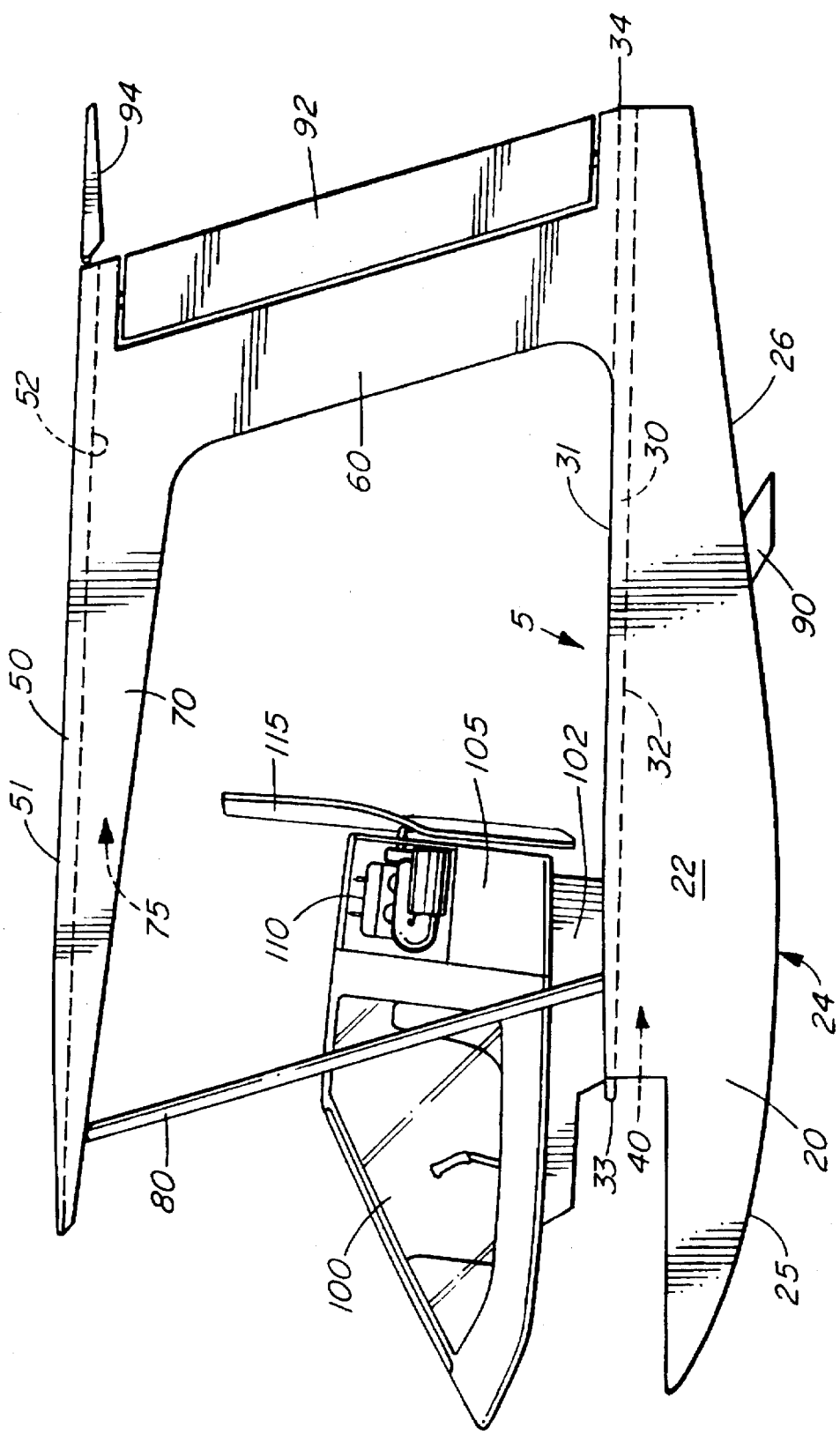
FIG. 2 is a side elevation view of the vehicle shown in FIG. 1.

As best seen in FIG. 2, pontoon side 20 includes an intermediate bottom portion generally designated 24 which sits lowermost when the vehicle is idly afloat in water. To provide reduced resistance to forward motion, a forward bottom portion 25 merges with and curves upwardly and forwardly from intermediate portion 24. Further, outer surface 22 rounds inwardly towards the front of the pontoon. An elongated rearward bottom portion 26 merges with and extends upwardly and rearwardly from intermediate portion 24 thereby giving air entrapment chamber 40 a vertical taper from fore to aft.

Pontoon side 10 is substantially the mirror image pontoon side 20. When the vehicle is idly afloat, it will sit with the horizontal attitude depicted in FIG. 2. As can be seen in FIG. 1, inner surfaces 11, 21 of pontoon sides 10, 20 are substantially flat surfaces which lie in parallel vertical planes both beneath deck 30 and in advance of deck 30. With respect to the portions of these surfaces which extend in advance of deck 30, there is no transverse rounding or streamlining as in the case of outer surfaces 12, 22, the purpose being to minimize the amount of water which sprays back inwardly as the vehicle moves forward through water.

While deck 30 may have a flat construction, it will be best seen in FIG. 2 that there is an arch or camber in upper surface 31 from fore to aft. Beginning from leading edge 33 of deck 30, upper surface 31 first extends rearwardly in a substantially horizontal plane; then curves to extend downwardly and rearwardly matching the angle of attack of chamber 40. In essentially the same manner as the upper surface of an aircraft wing, the camber serves to produce substantial negative pressure lifting force on the vehicle in response to forward motion of the vehicle.

Herein, negative pressure means pressure less than ambient atmospheric pressure. Positive pressure is pressure greater than ambient and, as noted above, is characteristic of the dynamic air pressure which is produced in air entrapment chamber 40.

The surface effect vehicle shown in the Figures further includes an airfoil 50 having upper and lower surfaces 51, 52 spaced above and interconnected with vehicle body 5, canopy-like, by means of a pair of vertical stabilizers 60 which are rearwardly mounted on opposed sides of the body, and a pair of support braces 80 which are forwardly mounted on opposed sides of the body. Each vertical stabilizer carries an air rudder 92 for turning control in air. An elevator flap 94 is mounted across the trailing edge of airfoil 50 for increased control over the vehicle's angle of attack in air.

Opposed stabilizing sides 70 are integrally formed with corresponding ones of the vertical stabilizers 60. Each stabilizing side 70 extends longitudinally forward from the corresponding vertical stabilizer and downwardly from a corresponding end of airfoil 50. Together with lower surface 52 of airfoil 50, stabilizing sides 70 form a longitudinally extending, downwardly depending, air channel 75 above upper surface 31 of deck 30.

As best seen in FIG. 2, airfoil 50 has a camber from fore to aft, the forward angle of incidence being a few degrees positive relative to upper surface 31 of deck 30. Canted slightly ahead of deck 30, airfoil 50 with its higher angle of incidence presents a lift surface which is first to provide significant lift in response to increasing forward speed of the vehicle. As will be evident from FIG. 2, the center of such lift will be substantially forward of the trailing end of air entrapment chamber 40. Further, since airfoil 50 is substantially shielded from surface effects by deck 30, the lifting force which is provided is a negative pressure lifting force substantially out of surface effect.

The vehicle shown in the Figures also includes a passenger cabin 100 centrally mounted widthwise on deck 30 on a pair of parallel rails 102 (only one of which appears). A propeller 115 driven by engine 110 and mounted immediately behind cabin 100 provides a means of propulsion for the vehicle. Fuel for the engine is carried by a tank 105 carried immediately behind cabin 100 on rails 102. Longitudinally, the entire load carried by rails 102 lies towards the forward end of deck 30 and above the area where pontoon sides 10, 20 are at their thickest (viz. above intermediate bottom portion 24 as shown in FIG. 2 in the case of pontoon side 20).

Although somewhat variable depending upon the weight of the vehicle operator in passenger compartment 100 and any miscellaneous items which the operator may carry along, the center of load carried by rails 102 will be well forward of the vehicle's center of lift when the vehicle is operating in surface effect. In the embodiment shown which has a relatively high aspect ratio, the center of load sits within the first 25% of deck 30. So positioned, the load serves to better balance against any conditions which may tend to pitch the vehicle up or, in a worst case, cause the vehicle to flip backwards.

With respect to roll, the positioning of the load on rails 102 below upper air channel 52 provides a stabilizing characteristic which is in the nature of a pendulum or self-righting effect. If the vehicle tends to roll about a longitudinal axis, then the load will counteract with its center of gravity seeking out a position of lowest potential energy beneath the channel.

In operation, the vehicle will normally start with the horizontal attitude depicted in FIG. 2 and will substantially maintain this attitude during slow ahead movement in water. As the vehicle accelerates, dynamic water forces acting under pontoons sides 10, 20 will urge the vehicle to the surface of the water. Concurrently, airfoil 50 will begin to provide a significant negative pressure lifting force which is pressure lifting force which is enhanced by the build up of positive pressure in air channel 75. Ultimately, there will be a nose up rotation where the vehicle rocks back on the rearward bottom portions of pontoon sides 10, 20. As such rotation occurs, the longitudinal passage for air through the chamber becomes progressively more constricted as the rearward end of air entrapment chamber 40 begins to close towards the surface of the water. The resulting compression of air in chamber 40 leads to the development of a significant positive pressure lifting force. As the vehicle continues to accelerate, such lifting forces continue to increase. Ultimately, the combined lifting forces are sufficient to lift the vehicle clear from the surface of the water. The camber of upper surface 31 on deck 30 then serves to enhance or add to the combined lifting forces.

In flight and no longer slowed by water drag, the vehicle moves near the surface of the water with a moderate angle of attack, air entrapment chamber 40 reacting to provide substantial positive pressure or surface effect ram air lifting force on the vehicle. Airfoil 50 continues to provide substantial lifting force.

Although the vehicle is capable of free flight out of surface effect, such operations are generally considered disadvantageous because there will be a substantial loss in load capacity. Sustained free flight would be inefficient and would require substantially more engine power than that required to sustain surface effect flight while still permitting brief excursions to higher elevations (for example, to lift and pass over an obstacle on the surface).

It will be observed that the flight control is essentially a two-axis control: rudders 92 to allow turning and control yaw about a vertical axis; and, elevator 94 to control pitch about a transverse horizontal axis. There is no roll axis control about a longitudinal axis. For the embodiment shown, a roll axis control is considered unnecessary in view of the self-righting characteristic of the vehicle as noted above.

The embodiment shown is particularly suitable as a small recreational vehicle for water based operations. It may be readily manufactured with a width (for example, 8 feet) which does not exceed road or highway traffic regulations. With a relatively high aspect ratio (about 1 to 2), such a vehicle may be easily carried by trailer and stored in the same size of garage as may be used to hold a family car. When afloat, and since it is unfettered by wings extending outwardly from the vehicle body, it may also be accommodated in relatively small docking spaces and is easy to embark and disembark. For this size, a conventional engine and drive like that for an ultralight aircraft may be used (e.g. a water-cooled two stroke gasoline engine).

As noted above, surface effect vehicles are normally best suited for water based operations. But, they are capable of surface effect flight over other surfaces such as dry land or ice. The same is true for the embodiment shown in the drawings. However, in the event of a situation where operations were to be based on a surface such as dry land, ice or the like, then body sides 10, 20 as presently represented by pontoons can obviously be modified or changed to best suit the intended working environment. There would be no necessity for the sides to provide flotation. Thus, depending upon the working environment, the sides may be configured to include skis, wheels or other suitable means to permit takeoff and landing.

Accordingly, the embodiment which has been described is to be considered in all respects only as illustrative and not as restrictive. The present invention may be embodied in other specific forms, including forms with different sizes, different body shapes, different aspect ratios and other differences, but without departing from the spirit or essential characteristics of the invention. Various changes and modifications are possible and will undoubtedly occur to those skilled in the art.

Thus, the scope of the invention is indicated by the appended claims rather than by the description of the foregoing embodiment. All changes or modifications which come within the meaning and range of equivalency of the claims are considered to be embraced within their scope.

I claim:

1. A surface effect vehicle, comprising:

(a) a vehicle body having opposed longitudinally extending sides and a longitudinally extending deck having upper and lower surfaces extending widthwise between said sides, said lower surface together with opposed inner surfaces of said sides forming a downwardly depending air entrapment chamber extending longitudinally beneath said lower surface, said air entrapment chamber being reactive to provide substantial surface effect ram air lifting force on said vehicle in response to forward motion of said vehicle;

(b) an airfoil spaced above and interconnected with said body, at longitudinally extending sides of said airfoil by vertical stabilizers mounted towards the rearward end of said body, (i) said airfoil extending forward from said vertical stabilizers as a canopy over said body and being positioned to provide a center of lift substantially forward of a trailing end of said air entrapment chamber; and, (ii) said airfoil being reactive to provide substantial out of surface effect lifting force on said vehicle in response to said forward motion of said vehicle;

(c) vertical stabilizing means for providing aerodynamic vertical stabilization for said vehicle; and, (d) propulsion means for providing said forward motion to said vehicle, said lifting forces of said air entrapment chamber and said airfoil being reactive in combination to enable flight of said vehicle in surface effect.

2. A surface effect vehicle as defined in claim 1, wherein said sides of said body comprise a pair of pontoons for providing water flotation for said vehicle.

3. A surface effect vehicle as defined in claim 2, wherein each pontoon includes an intermediate bottom portion which sits lowermost when said vehicle is idly afloat in water, a forward bottom portion extending upwardly and forwardly from said intermediate bottom portion, and an elongated rearward bottom portion extending upwardly and rearwardly from said intermediate bottom portion.

4. A surface effect vehicle as defined in claim 1 including opposed stabilizing sides each extending longitudinally forward from a corresponding one of said vertical stabilizers and downwardly from a corresponding longitudinally extending side of said airfoil, said stabilizing sides together with a lower surface of said airfoil forming a longitudinally extending, downwardly depending, air channel above said upper surface of said deck.

* * * * *